United States Patent [19]

Gardner, Jr.

[11] Patent Number: 4,763,751

[45] Date of Patent: Aug. 16, 1988

[54] ELECTROHYDRAULIC MOTOR TRANSMISSION VEHICLE DRIVE SYSTEM

[76] Inventor: Elmer W. Gardner, Jr., P.O. Box 39463, Cincinnati, Ohio 45239

[21] Appl. No.: 27,838

[22] Filed: Mar. 19, 1987

[51] Int. Cl.$^4$ ............................................. B60K 9/04
[52] U.S. Cl. .................................... 180/305; 180/69.6
[58] Field of Search .................... 180/305, 69.6, 306, 180/307, 308

[56] References Cited

U.S. PATENT DOCUMENTS

| | | | |
|---|---|---|---|
| 3,948,047 | 4/1976 | Gilbert | 180/305 |
| 4,413,698 | 11/1983 | Conrad et al. | 180/305 |
| 4,469,187 | 9/1984 | Hagin et al. | 180/69.6 |
| 4,481,841 | 11/1984 | Abthoff et al. | 180/69.6 |
| 4,588,040 | 5/1986 | Albright, Jr. et al. | 180/69.6 |

Primary Examiner—Richard A. Bertsch

[57] ABSTRACT

An electrically operated vehicle in which a battery provides energy for driving an electric motor coupled to a pump for pressurizing hydraulic fluid that is transmitted to a hydraulic motor transmission comprising either a worm screw gear or rack gear with each end operatively connected to a piston inside a cylinder having a chamber for receiving pressurized fluid providing power for reciprocatably driving either a worm screw gear or a rack gear to operative elements for providing rotation to an output shaft operatively connected either to the axles or the differential of a vehicle. Provision is also made for the recovery of kinetic energy by the application of a series of wind generators and a series of gravitational generators responsive to vehicular movement. Additional electricity is generated by connecting a second hydraulic motor transmission to a series of alternators arranged for supplying electricity to the principal battery source for electrical power for driving the vehicle and also to a second battery source for driving the second hydraulic motor.

3 Claims, 4 Drawing Sheets

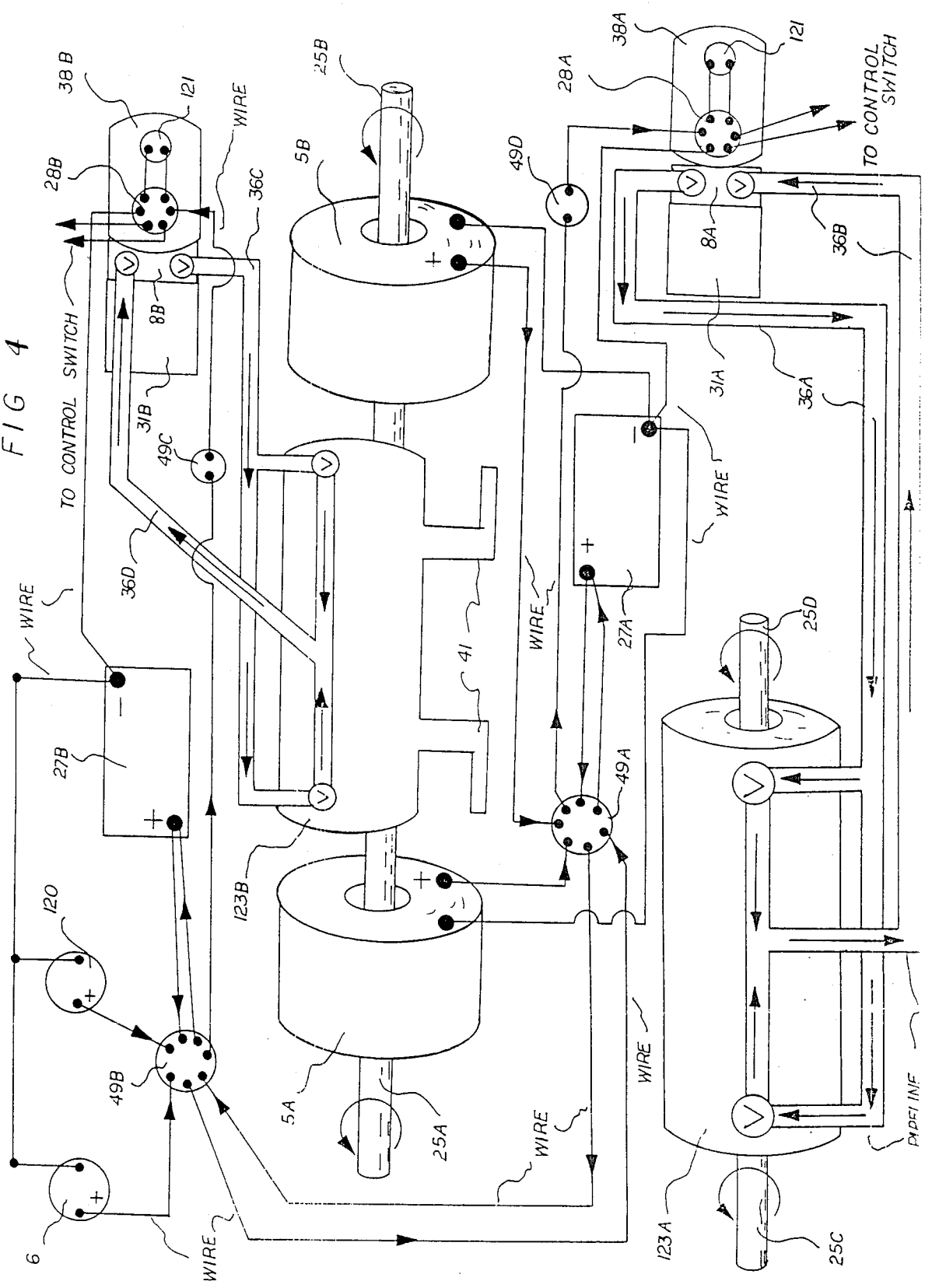

ELECTROHYDRAULIC MOTOR TRANSMISSION VEHICLE DRIVE SYSTEM

TECHNICAL FIELD

This invention relates to a regenerative vehicle drive system that is either pneumatically or hydraulically controlled and has electricity has its power source.

BACKGROUND OF THE PRIOR ART

A thorough search was conducted covering all aspects of previous vehicular drive systems and prior art does not disclose a device similar to that disclosed in this patent application. Prior art has disclosed a number of vehicle drive systems using wind generators in combination with electric motor driven vehicles, quite a number of vehicle drive systems having gasoline engines for driving a generator or alternator for supplying electricity to an electric driven vehicle, and also the opposite whereby an electric motor is the auxiliary power to a gasoline driven vehicle, a number of energy storage devices as flywheels in combination with the gasoline engine and also several hydraulically driven vehicles having electricity as the power source.

In U.S. Pat. No. 4,413,698 Conrad there is disclosed a hydraulically motor driven vehicle that is battery controlled, has a hydrostatic transmission and a hydraulically driven generator for the recharging of batteries. The Gilbert U.S. Pat. No. 3,948,047 relates to a turbine wheel of improved design having a hydraulic pump as a source of power that is driven by an electric motor or gasoline engine and the output of the pump is connected across a sequencing valve to a rotor or a power wheel unit. In U.S. Pat. No. 3,379,008 there is disclosed a turbine having a vane rotor within its shaft connected to a transmission and responsive to compressed air to propel a vehicle. In U.S. Pat. No. 2,468,828 Kopp there is disclosed the use of a turbine type hydraulic motor in a vehicle drive system. In U.S. Pat. No. 3,456,520 there is disclosed a hydraulic drive in which a hydraulic motor drives the vehicle and also serves as a pump during braking. In U.S. Pat. No. 3,734,225 there is disclosed an improvement in an hydrostatic drive system by the adjustment of the control means by regulating the pressure so that the hydraulic motor operates as a constant motor. Hydraulic motor drives have been driven either by an electric motor to a pump or by a gasoline engine, and in several of the disclosures the hydraulic drive system serves as auxiliary power to the gasoline engine driven vehicle.

In the Spahn U.S. Pat. No. 3,556,239 there is disclosed a battery powered vehicle having air operated turbines for providing charging current to batteries and for driving the vehicle. In U.S. Pat. No. 4,002,218 Horvat there is disclosed a series of flat rotary vanes operated by fluid currents that generate electricity through sensing switching controls to a storage battery for providing electricity to an electric motor for driving the vehicle. In U.S. Pat. No. 4,254,843 Han there is disclosed the application of a whirl ventilator system using air flow and vehicle momentum to a clutch mechanism at the drive shaft for driving an electrical generator in the recharging of batteries for supplying electricity for driving an electric motor to the vehicle, and also an on-board fuel powered engine for driving an electric generator.

In the Horwinski U.S. Pat. No. 3,904,883 there is disclosed a hybrid energy converter and transmission unit wherein one and the same electrical machine is used as the driving motor and also as the generator for the recharging of batteries in an electric driven vehicle. This required high starting currents. In U.S. Pat. No. 40,042,056 Horwinski, there also is disclosed a hybrid vehicle power system involving both an electric motor and an internal combustion engine, wherein excessively and abnormally high starting currents are eliminated by using a simplified power transmission having an exceptionally high speed ratio and range, and one set of wheels is powered by the internal combustion engine and the other set of wheels is powered by an electric motor. The drive comprises a combination to a magnetic clutch with chain drive to the front and the rear wheels to sets of cone pulleys connected by a chain drive to the motor. In U.S. Pat. No. 2,974,769 there is disclosed a vehicle transmission in which mechanical energy is obtained from an internal combustion engine that is connected through a magnetic particle clutch to a gear box which is coupled to the drive shaft of a vehicle. In U.S. Pat. No. 3,845,835 there is disclosed an electric power plant for a land vehicle which includes an electric motor, for turning the drive shaft of the vehicle, two alternators also driven by the motor, a voltage regulator for the alternators and two sets of batteries charged alternately through the regulator. The battery not being charged energizes the motor. The alternators are connected to the axles of the vehicle. In U.S. Pat. No. 3,077,121 there is disclosed an automatic transmission control system which includes a plurality of magnetic particle clutches. And other examples of transmission mechanisms employing magnetic partical clutches include U.S. Pat. No. 2,688,388 and U.S. Pat. No. 2,718,157. In U.S. Pat. No. 3,917,017 there is disclosed a battery operated vehicle drive system in which two sets of series connected batteries are alternately charged by an internal combustion engine under control of a change over selector. The vehicle speed is controlled by selection of power terminals, at different voltage levels, from which the drive motor is energized. In U.S. Pat. No. 3,367,438 there is disclosed a power plant for a vehicle in which an internal combustion engine and an electric motor are used alternatively for powering a vehicle.

In U.S. Pat. No. 4,095,664 Bray there is disclosed an arrangement in which a constant speed AC motor is energized through an A.C. alternator which is driven primarily by a battery powered 12VDC motor which also drives three DC rectified alternators used for providing energy to recharge batteries and energize the magnetic clutch that is coupled to the output shaft of the AC motor, and a small gas motor is detachably connected to the alternators in parallel with the DC motor and operates only when power in the batteries becomes lower than a predetermined level. The vehicle is primarily powered by the electric motor AC to the particle clutch producing a variable speed to the drive shaft of the vehicle and in certain instances the vehicle is covered by the gasoline engine.

In U.S. Pat. Nos. 4,042,054 and 4,042,055 Ward there is disclosed a means for providing a lighter frame requirement and reduced battery load, and also a chain drive is associated with each drive wheel and the vehicle has a non rotating axle, is electrically driven by a DC electric motor and has a battery pack that can easily be removed from the vehicle.

In U.S. Pat. No. 3,575,250 there is disclosed an electric driven vehicle with each wheel having its own motor that are series connected at one setting and parallel connected to another, and in turning, one of the motors will load and slow down and the other will speed up in a differential action.

In U.S. Pat. No. 3,190,387 there is disclosed a four wheeled vehicle having two drive wheels each provided with its own motor carried on the vehicle frame which is sprung up on the wheels.

In U.S. Pat. No. 3,878,913 Lionts there is disclosed a weighted flywheel operatively connected to a fan and through reduction gearing to a generator shaft and to a freewheeling type of clutch overdrive for charging batteries for driving an electrically powered vehicle.

In U.S. Pat. No. 3,734,222 Bardwick there is disclosed an inertial energy flywheel system which includes clutch means for introducing energy to the flywheel from an engine or from a coasting or decelerating vehicle and a clutch means for transferring the stored energy to the vehicle on demand.

In U.S. Pat. No. 3,882,950 Strohlein there is disclosed a means for withdrawing surplus power from the primary source of power to a vehicle and storing it in a flywheel operatively connected to the drive train of a vehicle at selected times and to use this energy to drive the vehicle.

In U.S. Pat. No. 2,941,613 and U.S. Pat. No. 3,444,946 there is disclosed a clutch and flywheel governed transmission of generator driving power from a rotary fan with an intake air scoop and fan housing.

In U.S. Pat. No. 3,621,929 Oberthur there is disclosed regenerative braking in which an electric motor operating as a generator to the rear axles of a vehicle with the hydraulic braking system not taking effect until the electric motor braking has reached it maximum value.

In U.S. Pat. No. 4,277,737 Werth there is disclosed a means for utilizing rechargeable batteries in the operation of electric vehicles by recharging one or more battery blocks, each consisting of several batteries, by generators driven by braking energy, solar-cell arrays, or a power supply drawing rectified and stabilized current from a utility network.

U.S. Pat. No. 4,348,628 Loucks there is disclosed an electric driven vehicle having an electric motor operated by two alternating power circuits, each having a battery with a circuit for an open and closed mode of operation that permits the electric motor to be operated by one battery while the other battery is being charged.

U.S. Pat. No. 4,533,011 Heidemeyer and Zantopp there is disclosed a hybrid drive for an electric vehicle having an electric motor being connected with a driving axle of the vehicle by means of a first disconnecting clutch and with an internal combustion engine arranged in series therewith by means of a second disconnecting clutch wherein the internal combustion engine is designed without a flywheel and the flywheel mass required for its operation is an integral component of the rotating masses of the drive between the disconnection points of the two disconnecting clutches.

U.S. Pat. No. 4,227,587 Carman there is disclosed an automotive drive system in which an hydraulic pump is mechanically coupled to the wheels of a vehicle for pumping fluid under pressure to an accumulator for transmission to an hydraulic motor mechanically coupled to the engine for driving said engine, including speed responsive means for stopping the flow of hydraulic fluid from said accumulator to said motor when the engine has reached a predetermined speed.

U.S. Pat. No. 4,532,769 Vestermark there is disclosed an energy storing flywheel assembly comprising two hubs having first and second reels with the second hub being larger than the first with a coiled ribbon extending between the first and second hub and a clutch control mechanism for transmitting rotational power from a power input to a power output shaft.

U.S. Pat. No. 4,383,589 Fox there is disclosed a pneumatic vehicle drive system in which each wheel is provided with a motor driven by a compressed air from a storage tank and the rotation of each wheel is also utilized for driving air compressors in compressing air for storage.

U.S. Pat. No. 4,163,367 Yeh there is disclosed a hybrid flywheel/compressed fluid propulsion system for vehicle drive comprising a compressed fluid power turbine in conjunction with the use of a flywheel in which the turbine serves as a compressor expander for driving an output shaft and for recovering kinetic energy during braking and deceleration and the flywheel is used for recovering kinetic energy and for driving an output shaft and an AC alternator and the flywheel/motor/alternator unit can be driven by an A.C. motor transmitting shaft power to the expander/compressor.

U.S. Pat. No. 4,290,268 Lowther there is disclosed an auxiliary kinetic energy recovery system for a vehicle with a rotary sliding vane engine including a compressor, a combustion chamber and a motor in which the braking is done by connecting the rotor of the compressor to a wheel and braking rotation of the rotor by controlling the gas flow through the rotary sliding vane compressor.

U.S. Pat. No. 4,590,767 Gardner, Jr there is disclosed an auxiliary power drive system, including kinetic energy recovery, coupled to an internal combustion engine in which by passed exhaust gas is fed to a rotary vane for driving an output shaft and also for compressing air, and an electrohydraulic motor as auxiliary power to the internal combustion engine, including the application of alternators, hydraulic pumps and compressors to the drive shaft and to the wheels of a vehicle.

The greatest problem experienced with the electric and hydraulic driven vehicle is the need for greater efficiency, for hydraulic motors and electric motors are most efficient at constant speed which presents considerable difficulty in a variable speed drive system as evidenced in vehicular drive. With the electric vehicle, high starting torque is necessary which requires a high starting current that causes a high internal voltage drop in the batteries. Amperage hour capacity goes down drastically with high current draw and also the life of the battery. And as shown in the prior art, whether electric motors are adapted to the drive wheels or to the drive shaft, it is necessary to gear down the electric motor as it functions best at high RPM. Torque is difficult to control with the electric motor and also with the hydraulic motor.

The electrohydraulic vehicle drive system offers an advantage and in U.S. Pat. No. 4,413,698 Conrad there is disclosed a method for providing a constant speed electric motor to a hydraulic drive system in which the fluid flow to the hydraulic motors is controlled by a system of valves which also control the speed of the vehicle. This had eliminated the need for a high starting torque to the electric motor and with a reduction in the overall size of the batteries needed, however, the hydraulic motors require a constant high pressure flow of fluid at all times in order to be operational and this causes inefficiency.

The prior art does not disclose one system that is efficient enough and has the provision for providing the total energy source for driving a vehicle over long range without the need for downtime and the recharging of batteries or the need for an external supply of fuel in a manner similar to the gasoline or diesel engine.

For any vehicle to replace or serve as a substitute to the internal combustion engine, its efficiency must be at the maximum and with the capability for regenerating a high percentage if not all of the energy needed for driving the vehicle under all road conditions.

In the prior art U.S. Pat. No. 4,413,698 inventor Conrad has succeeded in regenerating a high percentage of energy by the application of an electric motor connected to a pump for driving an alternator, however, the hydraulic motor that drives the alternator lacks the efficiency needed for generating a higher percentage of electricity.

The variable and exceedingly high energy demands for driving vehicles has not been met with a complete and comprehensive regenerative system and has fallen short of providing competitive performance characteristics of that experienced with the internal combustion engine; so no hybrid vehicular drive system has proven to be wholly suitable, adaptable and totally acceptable as an alternative power source for driving non stationary vehicles, mainly because it relies too heavily upon external means for supplying the energy necessary for operating such a system.

SUMMARY OF THE INVENTION

This invention relates to a hydraulic motor arrangement in which pressurized hydraulic fluid is fed to two separate hydraulic cylinders each hava working chamber with a piston therein. The two cylinders are arranged in opposing directions in a horizontal or vertical plane having the blind end for displacement of working fluid to the piston. The piston inside the cylinder is connected to one end of either a worm screw gear or a rack gear that extends operationally between the two pistons when the piston is loaded.

When a worm screw gear, serving as a transmission and drive element to an output shaft, is used, the worm screw gear has a right hand screw pitch at one end and a left hand screw pitch at the other end and a hollow output shaft therebetween through which the worm screw gear is reciprocated by the loaded pistons in the cylinders.

At each end of the output shaft is a counter balanced flywheel having an opening to its center the same diameter as the opening to the hollow output shaft connected thereto, and a second hollow shaft slidably adapted to the inside of said output shaft is connected at each end to a bearing that is connected to a clutch for free rotation thereof and engagement and rotation to the flywheel when the worm screw gear is reciprocated to a clutch plate fixed to said clutch and having a rectangular gear to its center through which the non rotatable worm screw gear reciprocates.

The output shaft is mounted to bearings fixed to a stationary mount, and a series of either gears or pulleys or both can be fixed to the output shaft providing for a rotatable power connection to a jackshaft having at least two variable pulleys and a clutch mechanism, that provides for a controlled power connection between the mechanical transmission and drive axles to wheels of a vehicle. The mechanical transmission and hydraulic motor are contained and enclosed within a housing that is mounted to the axle housing of a vehicle.

The arrangement is for the hydraulic motor as a piston driven device to drive the output shaft to a transmission that is mechanically operated in which the output shaft is rotatable to two operable ends when it is a gear driven element as with either a helical, spiral, or spur rack gear or a bevel gear arrangement to the output shaft. With the worm screw gear, the jackshaft serves as the final output shaft.

With a standard vehicle having an internal combustion engine with a transmission, either automatic or manual, a drive shaft and a differential connected to axles to the wheels, the engine, transmission, drive shaft and differential are removed from the vehicle as drive elements, and the electrohydraulic motor transmission is mounted to the axle housing of the vehicle with either pulleys or gears mounted to the short splined axle and bearings containing the spiral gear normally used in the differential in which the spiral gear is removed and either the pulleys or gears connected to the jackshaft drive the two axles to the wheels of the vehicle. It is a simple arrangement that is very inexpensive and provides for a relative easy connect ion requiring very little mechanical knowledge or experience.

When the gear arrangement is used having a rack gear connected between the two pistons for driving a second gear connected to an output shaft that rotates to the center of the pistons and extends through a sealed bearing an opening either to one end or both ends of the blind displacement section of the cylinders, either one end or both ends of the output shaft is connected directly to the wheels of a vehicle or, when used with a differential, the output shaft can be connected directly to a universal joint. This is also applicable to four wheel drive. Whereas, unlike the worm screw gear transmission, the gear drive transmission does not need a jackshaft, however, a clutch mechanism is adapted to the gear at the output shaft that provides for a method of engagement/disengagement to each gear permitting a one direction of rotation to the output shaft corresponding to the reciprocable movement of the rack gear to a pinion gear connected to a bevel gear.

The hydraulic motor transmission arrangement is driven by pressurized fluid that is circulated by a pump connected to an electric motor that is energized by a series of industrial type storage batteries. In order that sufficient energy can be supplied the batteries so that the vehicle can be driven over long distance without the necessity for recharging the batteries a power recharging unit is connected to the system in which a second series of storage batteries is mounted to the vehicle that provides the power for driving a second but smaller electric motor coupled to a second but smaller hydraulic pump for providing pressurized fluid to a second but smaller low pressure hydraulic motor transmission, particularly of the worm screw gear type, having an output shaft connected to an alternator or a series of alternators for generating electricity for storage.

A series of gravitational generators connected between the axle and body of the vehicle and a series of wind generators connected to the body of the vehicle for generating electricity during vehicular movement (this is fully explained in patent application Ser. No. 06/850,996) that is transmitted to a series of voltage regulators that are prearranged for directing the flow of electricity either to the first series of storage batteries or to the second series of storage batteries or both, depending upon the level of energy stored in any particular storage battery according to a preset arrangement.

In this manner, there is constant recharging of storage batteries that can provide the needed energy for driving the electric motors without stopping the vehicle for the recharging of batteries. The fluid pressure for driving the hydraulic motor for driving the alternator should require no more than 100 pounds per square inch, and the cylinder bore can be one inch or less. As the worm screw gear arrangement for driving the output shaft is the most efficient and offers the highest speed for rotating the alternator shaft in comparison to the gear arrangement, that gives considerably less revolutions to an output shaft for the distance traveled by the rack gear and pistons inside the cylinder.

OBJECTS OF THE INVENTION (1) To provide for a highly efficient means for driving a vehicle
(2) To operate a vehicle from a battery source that can provide for constant vehicular movement without the necessity for stopping the vehicle for the recharging of batteries
(3) A pollutionless means for driving a vehicle
(4) An easy means for adaptation of the Electrohydraulic Motor Transmission for vehicular drive.

DESCRIPTION OF THE DRAWINGS

FIG. 4 shows two separate operable hydraulic motor transmissions, one having a small electric motor coupled to a small pump for pressurizing fluid to the transmission having an output shaft at each end connected at each end to an alternator for generating electricity for a first and a second storage battery, the second storage battery provides energy for driving a second electric motor and pump operationally connected to a second hydraulic motor transmission for driving the vehicle.

BRIEF DESCRIPTION OF THE INVENTION

Figure 1:
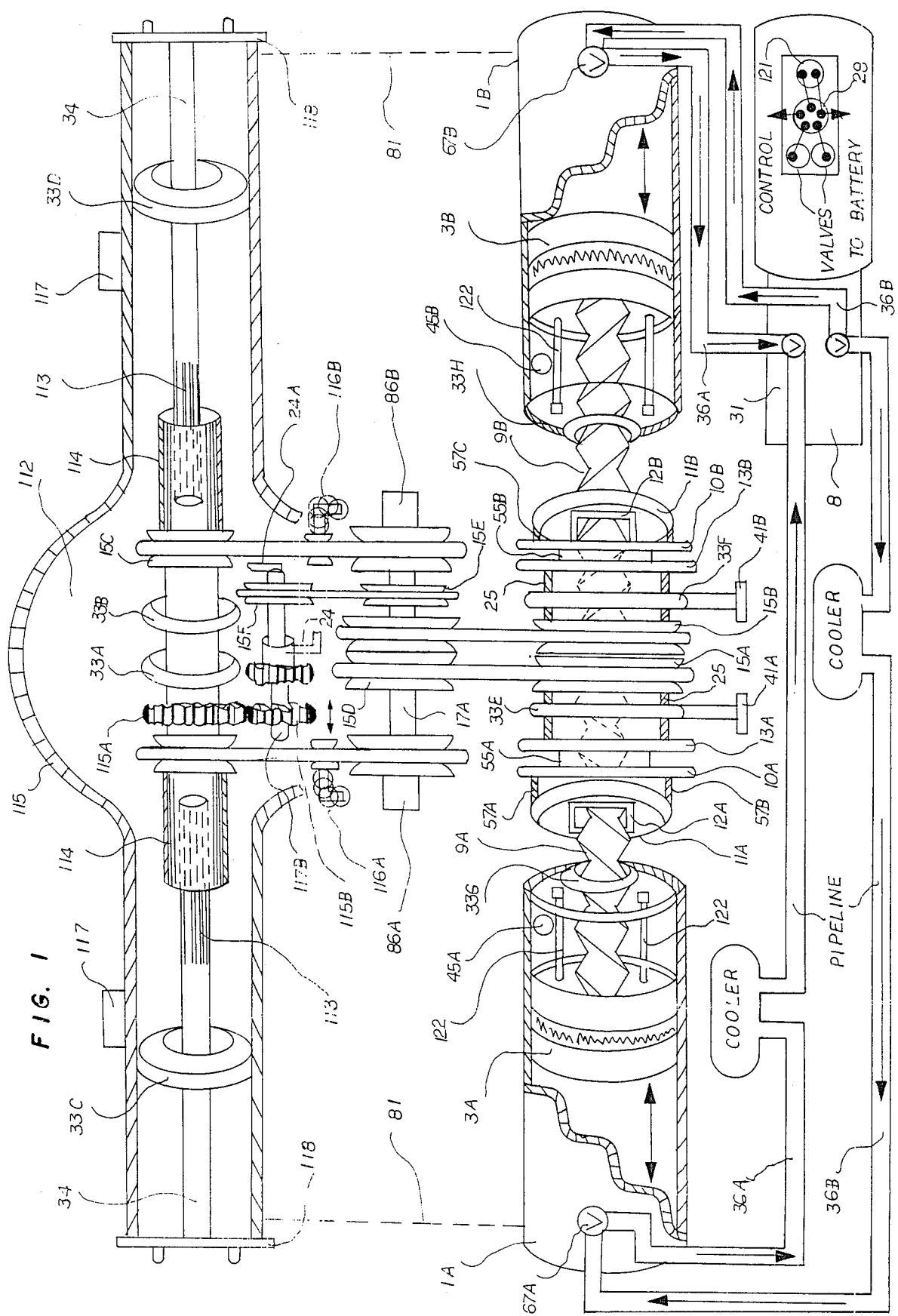
FIG. 1 shows the axle housing of a vehicle with the two axles connected to bearings and for engagement to a connecting shaft having mounted thereto bearings and a pulley to each drive axle that is connected to a jackshaft having variable pulleys, with the jackshaft connected to a power source by pulleys and belts, the power source being a mechanical transmission comprising a non-rotatable worm screw gear having each end connected to a piston in a cylinder that is driven by pressurized hydraulic fluid, and including an arrangement of gears to the jackshaft and the connecting axle shaft that provides for reverse gearing to the vehicle.

The basic purpose of this invention is to provide for a small, compact and highly efficient drive system that requires a minimum of space and weight and that can be inexpensive to operate and maintain. FIG. 1, by utilizing the standard axle housing 115 and axles 34 of a vehicle, including axle bearings 33C,33D and 33A and 33B and the inner connecting shaft 114, with removal of the differential gears (not shown) and mounting pulleys 15C and gear 115A to the inner shaft 114, it is possible to mount the jackshaft 17A, the gear jackshaft 17B providing for reverse gearing, and the hydraulic cylinders 1A and 1B with the mechanical transmission comprising a worm screw gear 9A and 9B inside an enclosed housing 81 mounted to the rear housing 115 of the vehicle. Considerable number of elements can be mounted inside the axle housing 112, especially with large vehicles as trucks and buses where the removal of the differential gears (not shown) would leave a large empty area. And the electric motor 38, hydraulic pump 8 and storage reservoir 31, including FIG. 3 and accumulator 30 could also be mounted to the axle housing 115.

Figure 2:
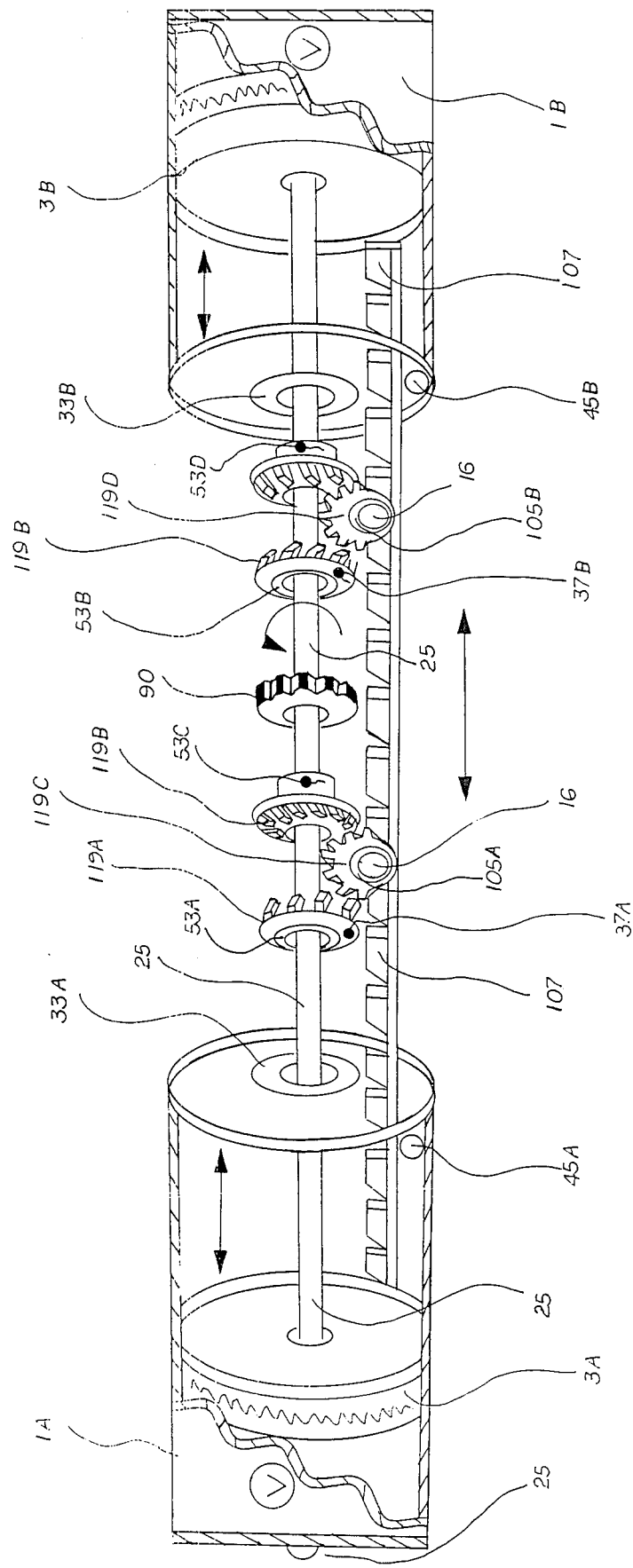
FIG. 2 shows an arrangement of bevel gears having clutch mechanism connected directly to an output shaft that is rotatable through a piston at each end and extends through the outside of each cylinder, and the pistons in the cylinder are arranged for driving a rack gear reciprocatably connecting a series of pinion gears for providing rotation to the bevel gears.
Figure 3:
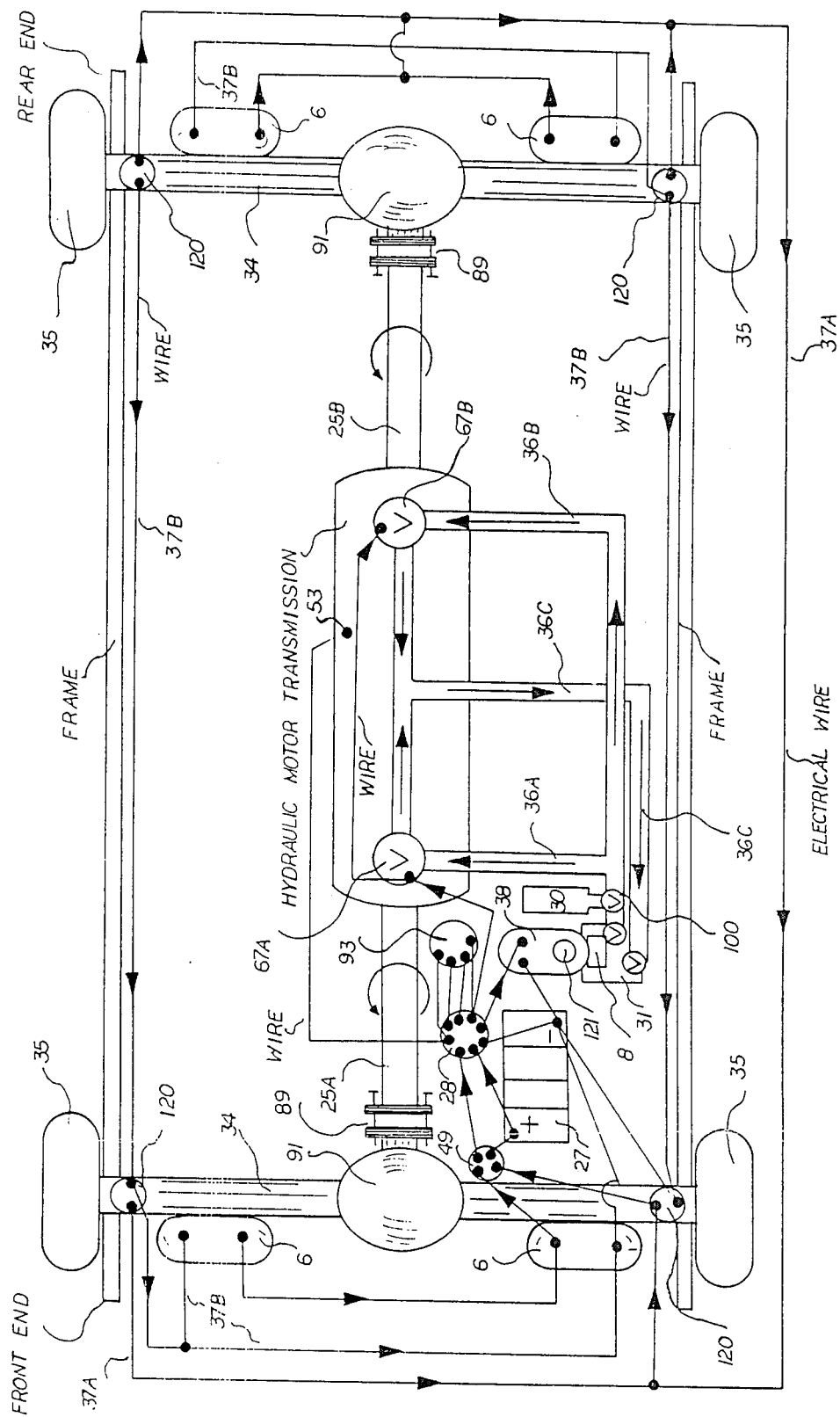
FIG. 3 shows a vehicle having two differentials, axles and housing connecting a frame and four wheels, with a universal joint at each end to the differential connecting a hydraulic motor transmission for receiving pressurized fluid from either a pump or an accumulator, the fluid being pressurized by the pump driven by and electric motor that receives its energy from a battery source that is charged by a series of wind generators and gravitational generators positioned to the vehicle axle housing and chassis.

FIG. 1, and FIG. 3, the preferred embodiment would be adaptation of the hydraulic motor transmission to the rear axle 34 housing 115, and differential 81 area of the vehicle and with removal of the gasoline tank also. FIG. 3, shows an arrangement for four wheel drive to a vehicle in which an axle 34 housing 115 is mounted to the frame at the front and the rear of a vehicle with the differential 91 having a universal joint 89 connected to a hydraulic motor transmission that can FIG. 2, comprise either a gear 90 drive from an output shaft 25 or as shown in FIG. 1, a worm screw gear 9A and 9B drive transmission.

FIG. 1, FIG. 3, and FIG. 4, the arrangement is for a storage battery 27 to provide energy through a master control relay 28 operator controlled through a master switch 93 at the operator's compartment of the vehicle to drive an electric motor 38 by energizing solenoid 121 for driving a hydraulic pump 8 combination storage reservoir 31 for pressurizing fluid transmitted through pressure compensating valves either to the accumulator 30 or to electric solenoid valves 67A and 67B through pipelines 36A to cylinders 1A and 1B for driving pistons 3A and 3B.

FIG. 1, and FIG. 2, shows two blind end cylinders 1A and 1B and in FIG. 1, a worm screw gear 9A and 9B having a right hand screw pitch at one end connected to piston 3B and a left hand screw pitch at the other end connected to piston 3A or vice versa, and the blind end of cylinders 1A and 1B serving as the pressurized chamber for driving the pistons 3A and 3B, and the end of the cylinder where the worm screw gear 9A and 9B is connected is a non pressurized area.

FIG. 1, the worm screw gear 9A and 9B arrangement is highly efficient, as the number of screw turns determine the number of revolutions imparted to an output shaft 25 when the worm screw gear 9A and 9B is driven reciprocatably and rectilinearly by the pistons 3A and 3B through a rectangular gear 12A and 12B that is fixed to a clutch plate 11A and 11B connected means control arms 57A and 57B, 57C and 57D to a freely rotatable clutch 10A and 10B that is connected to a bearing (not shown) that is connected at each end of a hollow shaft 55A and 55B that slidably extends through the hollow out put shaft 25 and serves as a means for engagement-/disengagement of the clutch 10A or 10B from making contact to a flywheel 13A or 13B that is counter balanced and fixed at each end of the rotatable output shaft 25. Although the worm screw gear 9A and 9B is driven reciprocatably by the pistons 3A and 3B, only one direction of rotation is imparted to the output shaft 25.

FIG. 1, with the worm screw gear transmission either a gear(not shown) or a pulley 15A and 15B can be mounted to output shaft 25 that is mounted to at least two bearings 33E and 33F fixed to a stationary mount 41A and 41B. The bearings 33E and 33F are the radial and axial thrust type. The two hydraulic motors comprising cylinders 1A and 1B have bearings 33G and 33H through which the worm screw gear 9A and 9B slidably operate reciprocatably and piston guides 122 serve to enforce a one direction of the slidable piston 3A and 3B to the action of the worm screw gear 9A and 9B. An electrical switch 45A and 45B (wiring not shown) that is wired to control relay 28 is a proximity switch that limits the movement of the piston 3A and 3B and also serves as a switching element to valves 67A and 67B for the input and output of working fluid at the hydraulic motor cylinders 1A and 1B.

FIG. 1, the arrangement is for pulley 15A and 15B having belts connected to pulleys 15D and 15E mounted to a jackshaft 17A that serves as a clutchable (not shown) means for a releasable power connection between the mechanical worm screw gear 9A and 9B transmission and the axles 34 A and 34B of a vehicle. Mounted to the jackshaft 17A are two variable pulleys 86A and 86B, that serve as a differential to the drive plates 118 and wheels (not shown) of a vehicle when going around curves, as the variable pulley each operate independent of one another with the wheel requiring more power having a gear reduction at either pulley 86A or 86B.

FIG. 1, as the belts connecting the variable pulleys 86A and 86B are flexible and require a controlled length that is variable according to the opening and closing of the pulley shaft at 86A and 86B, it is necessary that a means be provided for tightening the belts whereby constant tension is maintained by the application of a spring loaded idler 116A and 116B.

FIG. 1, a pulley 15E is connected to the jackshaft 17A having a belt connected to a second pulley 15f that is connected to a second jackshaft 17B that serves as a reverse gear shaft in that a slidable gear 115B is mounted to the jackshaft 17B that is manually controlled by the operator of the vehicle means control arm 24A and 24 for selectively and slidably engaging reverse gear 115B to 115A connected to the inner axle shaft 114 when the idlers 116A and 116B are released for slippage of belts between pulleys 15C at the inner axle shaft 114 and 86A and 86B at jackshaft 17A.

FIG. 1, jackshaft 17A is the power shaft for driving pulleys 15C to the inner axle shaft 114. The axles 34A and 34B each have an outside spline 113 that slidably connects the spline inside the inner shaft 114 for driving both axles 34 A and 34B simultaneously.

FIG. 2, the output shaft 25 connected to and between the two hydraulic motors comprising a blind end cylinder 1A and 1B having a piston 3A and 3B at each end, can have either a gear 90 or a pulley (not shown) as power output to a jackshaft arrangement as shown in FIG. 1, or it can have a gear box arrangement (not shown) similar to the standard transmission as used in a standard internal combustion engine for connection to the (FIG. 1) inner axle shaft 114. However, a combination of different gear arrangements can be applicable for driving the output shaft 25 as shown in FIG. 2. In FIG. 2 it is shown a spur type rack gear 107 having each end operably connected to the non pressurized end of piston 3A and 3B and arranged for reciprocable engagement to pinion gears 105A and 105B connected means shaft to housing 81.

FIG. 2, the pinion gears 105A and 105B are connected to a bevel gear 119C and 119D that are meshed to bevel gears 119A and 119B connected to the output shaft 25 means a clutch mechanism 53A and 53B that provides for the release of either bevel gear 119A or 119B so that one of the bevel gears can rotate freely to the output shaft 25 while the other bevel gear is engaged for imparting rotation to output shaft 25, depending upon the direction of reciprocation to the rack gear 107.

FIG. 2, as fully explained in patent application Ser. No. 06/945,006, the application of spiral, helical and other gears in a combination or singly as rack gears and rotatable drive gears can be used inlieu of the spur rack 107 gear as explained above.

FIG. 3 and FIG. 4, shows a method for regenerating electricity that can be fed to storage batteries 27A and 27B and that provides a constant supply of on-board electricity for operating the electric motor 38, the electric solenoid valves 67A and 67B, the relay 28 and electric clutch mechanism 53. Gravitational generators 120 ( as fully explained in patent application Ser. No. 06/ 850,996) are positioned vertically and operably between the axles 34 and the frame or chassis at each wheel 35 of the vehicle that generates electricity according to the up and down movement to the moving vehicle. Also a series of wind generators 6 ( as fully explained in patent application Ser. No. 06/850,996) positioned to the front end and rear end of the vehicle provide electricity that is fed through wires 37A to the positive side of battery 27 and through wires 37B to the negative side of battery 27 after passing through voltage regulator 49.

FIG. 3 and FIG. 4, a pressure compensating valve 100 controls the flow of pressurized fluid from accumulator 30 for transmission through pipelines 36A to hydraulic motor 123A and 123B for driving output shaft 25C and 25D and also 25A and 25B. Hydraulic motor 123b is a small size unit that is operatively connected to alternators 5A and 5B for generating electricity for storage in a series of industrial type batteries 27A and 27B. Battery 27A is the energy source for operating the electric motor 38A for driving pump 8A connected to storage reservoir 31A, and battery 27B is the energy source for driving electric motor 38B coupled to pump 8B that is connected to storage reservoir 31B.

FIG. 4, hydraulic motor 123B should preferably be a worm screw gear drive as explained in FIG. 1, because this is the most efficient and effective type of drive and it is also the least expensive, and it would also provide a greater number of revolutions per minute to the alternators 5A and 5B for generating electricity that is fed through wires first to a preset and prearranged multiple pole voltage regulator 49A that provides electricity to battery 27A or to relay 49B and to battery 27B according to the energy level in each battery as predetermined and arranged to each voltage regulator, whereby the voltage generated by the wind generators 6, the gravitational generators 120 is selectively transmitted by wire to either one or both batteries as needed, thus allowing for a constant and steady charging cycle that permits both electric motors 38A and 38B to operate at a predetermined constant speed. Voltage regulators 49C and 49D are the final control regulators for voltage input to the electric motors 38A and 38B after passing through switching relays 28A and 28B that are operator controlled through the operator's compartment of the vehicle. The input pipelines to hydraulic motor 123b for pressurized fluid is line 36C and for hydraulic motor 123A is pipeline 36A, and the expanded fluid is transmitted by pipelines 36B and 36D for return to storage reservoirs 31A and 31B.

The invention claimed is:

1. An electrically operated vehicle, including means for generating electricity, wherein said improvement comprises:
   a vehicle having an axle housing containing at least two axles and two wheels
   at least two hydraulic cylinder motors operatively connected to a mechanical transmission for providing power to an output shaft
   each of said hydraulic cylinder motors having at least one cylinder each having at least one chamber for receiving pressurized fluid
   each said chamber having an inlet and an outlet for the input and output of working fluid
   each said cylinder containing at least one operable piston therein having one end in working relationship to said pressure chamber and the other end operably connected to one end of a worm screw gear
   said worm screw gear operatively connected to operable elements between each said piston and cylinder for providing reciprocatable movement through a hollow output shaft when said piston in said cylinder is loaded
   a second hollow shaft slidably extending through said hollow output shaft and having bearings at each end connected to a rotatable clutch
   said rotatable clutch operably connected to a clutch plate having a rectangular gear at its center
   said rectangular gear operatively arranged to be driven by said worm screw
   a counter balanced flywheel connected to each end of said output shaft and operatively arranged for rotational engagement by said clutch when said worm screw gear is operatively engaged to said rectangular gear providing a one direction of rotation to said output shaft
   said output shaft operably connected to a clutchable jackshaft having at least two variable pulleys for operative connection to said axles and to said wheels for driving said vehicle
   an electric motor coupled to a pump for pressurizing hydraulic fluid
   a series of storage batteries providing energy for driving said electric motor
   electrical control means for providing electric energy to said electric motor
   means for regulating and controlling the flow of generated electricity for storage
   means for generating electricity including means for operatively connecting an alternator to the output shaft to said hydraulic cylinder motor transmission
   a closed circuit circulating system having controlled means for the flow of hydraulic fluid, including means for accumulating and storing hydraulic fluid
   valve means for controlling the flow of hydraulic fluid in said closed circuit circulating system 2. The apparatus according to claim 1 wherein the means for generating electricity and the mans for regulating and controlling the flow of generated electricity for storage includes:
   a series of alternators operatively connected to the output shaft of a second hydraulic cylinder motor operatively connected to a pump and an electric motor driven by a second storage battery
   means for regulating and controlling the flow of generated electricity including a series of perset and predetermined voltage regulators for selectively transmitting said generated current to a first arrangement of storage batteries and to said second storage batteries according to a predetermined value of the energy level in said batteries 3. An electrically operated vehicle, including means for generating electricity, wherein said improvement comprises:
   a vehicle having an axle housing containing at least two axles and two wheels
   at least two hydraulic cylinder motors operatively connected to a mechanical transmission for providing power to an output shaft
   at least two cylinders each having at least one pressure chamber for receiving pressurized fluid
   each said chamber having an inlet and an outlet for the input and the output of a working fluid
   each said cylinder containing at least one operable piston therein
   one end of said piston in working relationship to said pressure chamber and te other end of said piston operably connected to a rack gear
   said rack gear operably connected to at least two rotatable pinion gears
   each of said pinion gears operably connected to a second rotatable gear clutchably adapted to a rotatable output shaft
   said rotatable output shaft sealingly extending through each said piston and sealingly through the outer end of each said pressure chamber to the outside of said cylinder
   rotation of said output shaft when sad cylinder and said piston are loaded providing reciprocation to said rack gear and rotation to said gears connected to said output shaft
   an electric motor coupled to a pump for pressurizing hydraulic fluid
   a series of storage batteries providing energy for driving said electric motor
   electrical control means for providing electric energy to said electric motor
   means for regulating and controlling the flow of generated electricity for storage
   means for generating electricity including means for operatively connecting an alternator to the output shaft of said hydraulic cylinder motor transmission
   a closed circuit circulating system having controlled means for the flow of hydraulic fluid, including means for accumulating and storing said hydraulic fluid
   valve means for controlling the flow of hydraulic fluid in said closed circuit circulating system

* * * * *